(12) United States Patent
Paharik

(10) Patent No.: US 10,807,274 B2
(45) Date of Patent: Oct. 20, 2020

(54) PILLAR POST WITH ADJUSTABLE FLUID FLOW

(71) Applicant: The Fletcher-Terry Company, LLC, East Berlin, CT (US)

(72) Inventor: Benjamin Paharik, Hopkinton, MA (US)

(73) Assignee: The Fletcher-Terry Company, LLC, East Berlin, CT (US)

(*) Notice: Subject to any disclaimer, the term of this patent is extended or adjusted under 35 U.S.C. 154(b) by 0 days.

(21) Appl. No.: 15/596,506

(22) Filed: May 16, 2017

(65) Prior Publication Data

US 2017/0326756 A1 Nov. 16, 2017

Related U.S. Application Data

(60) Provisional application No. 62/337,034, filed on May 16, 2016.

(51) Int. Cl.
| | | |
|---|---|---|
| *B28D 1/22* | (2006.01) | |
| *F16K 5/04* | (2006.01) | |
| *B28D 7/02* | (2006.01) | |
| *F16K 1/04* | (2006.01) | |
| *B26D 3/08* | (2006.01) | |
| *B26D 7/26* | (2006.01) | |
| *C03B 33/027* | (2006.01) | |
| *C03B 33/10* | (2006.01) | |

(52) U.S. Cl.
CPC .......... *B28D 1/226* (2013.01); *B26D 3/085* (2013.01); *B26D 7/2621* (2013.01); *B28D 7/02* (2013.01); *F16K 1/04* (2013.01); *F16K 5/0414* (2013.01); *C03B 33/027* (2013.01); *C03B 33/107* (2013.01)

(58) Field of Classification Search
CPC ......... B28D 1/226; B28D 7/02; F16K 5/0414; F16K 1/04; B26D 3/085; B26D 7/2621; C03B 33/027; C03B 33/107
USPC .......................................................... 251/207
See application file for complete search history.

(56) References Cited

U.S. PATENT DOCUMENTS

| 1,017,292 | A | * | 2/1912 | Hyde | F16K 5/0605 |
| | | | | | 251/207 |
| 2,101,356 | A | * | 12/1937 | Zak | F16K 5/10 |
| | | | | | 251/207 |
| 2,631,002 | A | * | 3/1953 | Mueller | F16K 5/0414 |
| | | | | | 251/310 |

(Continued)

FOREIGN PATENT DOCUMENTS

| DE | 19954456 A1 | 6/2001 |
| GB | 2015123 A | * 9/1979 |

OTHER PUBLICATIONS

International search report for PCT/US2017/032844 dated Aug. 8, 2017.

*Primary Examiner* — Jonathan G Riley

(74) *Attorney, Agent, or Firm* — Getz Balich LLC

(57) ABSTRACT

An automated glass scoring device and a pillar post are provided. The pillar post includes a body having a fluid inlet port, at least one internal passage, a fluid exit port, and a fluid flow metering element. At least a portion of the fluid flow metering element is disposed within the internal passage. The at least one internal passage provides a path for a fluid flow from the inlet port to the fluid exit port, and the fluid exit port is positioned such that the fluid flow exiting the fluid exit port exits in close proximity to the cutter wheel.

10 Claims, 8 Drawing Sheets

(56) References Cited

U.S. PATENT DOCUMENTS

| | | | | |
|---|---|---|---|---|
| 3,850,063 | A | * 11/1974 | Witkoski | C03B 33/10 |
| | | | | 83/169 |
| 4,083,274 | A | * 4/1978 | Insolio | C03B 33/10 |
| | | | | 30/164.95 |
| 4,226,153 | A | 10/1980 | Insolio | |
| 5,305,986 | A | * 4/1994 | Hunt | F16K 5/0605 |
| | | | | 251/174 |
| 6,113,320 | A | 9/2000 | Ostermeier et al. | |
| 8,678,348 | B1 | 3/2014 | Cassel et al. | |
| 2002/0166909 | A1 | 11/2002 | Adachi et al. | |
| 2005/0092002 | A1* | 5/2005 | Wightman | F16K 3/0209 |
| | | | | 62/222 |
| 2014/0000433 | A1* | 1/2014 | Yamamoto | B26D 5/007 |
| | | | | 83/886 |
| 2015/0196148 | A1 | 7/2015 | Hoskins | |
| 2016/0018018 | A1 | 1/2016 | Blichmann | |

* cited by examiner

PILLAR POST WITH ADJUSTABLE FLUID FLOW

This invention claims priority to U.S. Patent Appln. No. 62/337,034 filed May 16, 2016, which application is herein incorporated by reference.

BACKGROUND OF THE INVENTION

1. Technical Field

The disclosure relates to automated glass scoring devices in general, and to glass scoring devices that include cutting fluid flows in particular.

2. Background Information

Automated glass scoring devices are publically available that typically include a table for supporting a glass plate and a carriage mounted on a bridge. The carriage includes a head for mounting a scoring wheel. The bridge and the carriage are movable relative to the table and a work piece (i.e., a glass plate) mounted on the table. The carriage is configured to move the scoring wheel along a first orthogonal axis (e.g., a Z-axis) for movement toward and away from the table (and work piece), and along a second orthogonal axis (e.g., a Y axis) relative to the table. The bridge is configured to move the carriage along a third orthogonal axis (e.g., an X axis) relative to the table. The scoring wheel is configured to create high stress linear regions in the work piece to enable the work piece to be subsequently fractured along the high stress linear regions. Fracturing a work piece such as glass plate along the high stress linear regions permits the portion of the glass plate with the desired geometry to be formed. U.S. Pat. No. 4,226,153 "Compensating Scoring Head", assigned to the Fletcher-Terry Company, discloses that the scoring head of an automated device may include a passage that allows a supply of cutting fluid to be dispensed adjacent a scoring wheel of the head to facilitate the scoring process.

SUMMARY OF THE INVENTION

According to an aspect of the present disclosure, a pillar post is provided. The pillar post includes a body having a fluid inlet port, at least one internal passage, a fluid exit port, and a fluid flow metering element. At least a portion of the fluid flow metering element is disposed within the internal passage. The at least one internal passage provides a path for a fluid flow from the inlet port to the fluid exit port, and the fluid exit port is positioned such that the fluid flow exiting the fluid exit port exits in close proximity to the cutter wheel.

According to an embodiment of any aspect of the present disclosure, the fluid flow metering element may be adjustable to at least a first position within the at least one internal passage and a second position within the at least one internal passage. In the first position the fluid flow metering device causes the fluid flow to have a first set of fluid flow characteristics exiting the fluid exit port, and in the second position the fluid flow metering device causes the fluid flow to have a second set of fluid flow characteristics exiting the fluid exit port. The first set of fluid flow characteristics is different than the second set of fluid flow characteristics.

According to any embodiment or aspect of the present disclosure, the first position may be at a first axial position within the at least one internal passage, and the second position may be at a second axial position within the at least one internal passage.

According to any embodiment or aspect of the present disclosure, the fluid flow metering element may include a threaded head and a distal end. The threaded head is in threaded engagement with the pillar post body, and the fluid flow metering element is adjustable to the first axial position and to the second axial position by rotating the threaded head relative to the pillar post body.

According to any embodiment or aspect of the present disclosure, the pillar post may further include a tubing connector having a distal end, and tubing connector distal end and the fluid flow metering element distal end are a mating pair.

According to any embodiment or aspect of the present disclosure, the fluid flow metering element may include an axial body extending between a distal end and a head, and the axial body is configured to form an annular passage disposed between an interior surface of the first internal passage and the axial body.

According to any embodiment or aspect of the present disclosure, the at least one internal passage may include a first internal passage and a second internal passage. The first internal passage extends from the fluid inlet port and intersects with the second internal passage, and the second internal passage extends from the fluid exit port. The fluid flow metering element is disposed within the first internal passage.

According to any embodiment or aspect of the present disclosure, the fluid flow metering element may include an axial body that extends between a distal end and a head. The axial body has an exterior surface, a central passage, and one or more lateral ports. The central passage extends inwardly through at least a portion of the axial body from the distal end toward the head, and the one or more lateral ports extend inwardly from the exterior surface of the axial body and intersect with the central passage.

According to any embodiment or aspect of the present disclosure, the fluid flow metering element may be rotatably mounted within the first internal passage and selectively positionable to the first position or to the second position. In the first position the fluid flow metering device may permit fluid flow to exit the fluid exit port, and in the second position the fluid flow metering may prevent fluid flow from exiting the fluid exit port.

According to any embodiment or aspect of the present disclosure, the fluid flow metering element may be rotatably mounted within the first internal passage and selectively positionable to the first position or to the second position. In the first position the fluid flow metering device may be configured to cause the fluid flow to exit the fluid exit port with the first set of fluid flow characteristics, and in the second position the fluid flow metering may cause the fluid flow to exit the fluid exit port with the second set of fluid flow characteristics.

According to any embodiment or aspect of the present disclosure, the one or more lateral ports may include a first lateral port and a second lateral port. In the first position, the first lateral port may be aligned with the second internal passage, and in the second position the second lateral port may be aligned with the second internal passage.

According to any embodiment or aspect of the present disclosure, the first lateral port has a first cross-sectional area and the second lateral port has a second cross-sectional area, and the first cross-sectional area is different from the second cross-sectional area.

According to any embodiment or aspect of the present disclosure, the fluid flow metering element may include at least one seal element engaged with the exterior surface of the axial body, the seal element extending around a circumference of the axial body.

According to any embodiment or aspect of the present disclosure, the fluid flow metering element may include a plurality of seal elements engaged with the exterior surface of the axial body. Each seal element extends around a circumference of a respective one of the first and second lateral ports.

According to any embodiment or aspect of the present disclosure, the fluid flow metering element may be rotatably mounted within the first internal passage and selectively positionable to the first position, the second position, a third position, or a fourth position. The one or more lateral ports includes a first lateral port, a second lateral port, a third lateral port, and a fourth lateral port. In the first position the first lateral port is aligned with the second internal passage, in the second position the second lateral port is aligned with the second internal passage, in the third position the third lateral port is aligned with the second internal passage, and in the fourth position the fourth lateral port is aligned with the second internal passage.

According to any embodiment or aspect of the present disclosure, the first lateral port has a first cross-sectional area, the second lateral port has a second cross-sectional area, the third lateral port has a third cross-sectional area, and the fourth lateral port has a fourth cross-sectional area, and the first cross-sectional area, second cross-sectional area, the third cross-sectional area, and the fourth cross-sectional area are each different from the other cross-sectional areas.

According to an aspect of the present disclosure, an automated glass scoring device is provided. The device includes a cutting fluid system, a table, a bridge, a carriage, and a cutter head. The bridge is mounted for translation along the table. The carriage is mounted for translation along the bridge. The cutter head is mounted with the carriage. The cutter head includes a pillar post for mounting a cutter wheel. The pillar post includes a body having a fluid inlet port, at least one internal passage, a fluid exit port, and a fluid flow metering element. At least a portion of the fluid flow metering element is disposed within the internal passage. The at least one internal passage provides a path for a fluid flow from the inlet port to the fluid exit port, and the fluid exit port is positioned such that the fluid flow exiting the fluid exit port exits in close proximity to the cutter wheel. The cutting fluid system is in fluid communication with the fluid inlet port of the pillar post, and is configured to selectively provide a flow of cutting fluid to the fluid inlet port.

According to any embodiment or aspect of the present disclosure, the fluid flow metering element may be adjustable to at least a first position within the at least one internal passage and a second position within the at least one internal passage. In the first position, the fluid flow metering device causes the fluid flow to have a first set of fluid flow characteristics exiting the fluid exit port, and in the second position the fluid flow metering device causes the fluid flow to have a second set of fluid flow characteristics exiting the fluid exit port. The first set of fluid flow characteristics is different than the second set of fluid flow characteristics.

According to any embodiment or aspect of the present disclosure, the fluid flow metering element may include a threaded head and a distal end, which threaded head is in threaded engagement with the pillar post body. The fluid flow metering element may be adjustable to a first axial position within the at least one internal passage, and to a second axial position within the at least one internal passage by rotating the threaded head relative to the pillar post body.

According to any embodiment or aspect of the present disclosure, the at least one internal passage may include a first internal passage and a second internal passage. The first internal passage extends from the fluid inlet port and intersects with the second internal passage, and the second internal passage extends from the fluid exit port. The fluid flow metering element is disposed within the first internal passage. The fluid flow metering element includes an axial body extending between a distal end and a head, the axial body having an exterior surface, a central passage, and one or more lateral ports. The central passage extends inwardly through at least a portion of the axial body from the distal end toward the head, and the one or more lateral ports extend inwardly from the exterior surface of the axial body and intersect with the central passage. The fluid flow metering element is rotatably mounted within the first internal passage and selectively positionable to the first position or to the second position.

DETAILED DESCRIPTION

The present disclosure is directed to a novel pillar post that is configured to allow the user to adjust a flow of cutting fluid dispensed through the pillar post.

Figure 1:
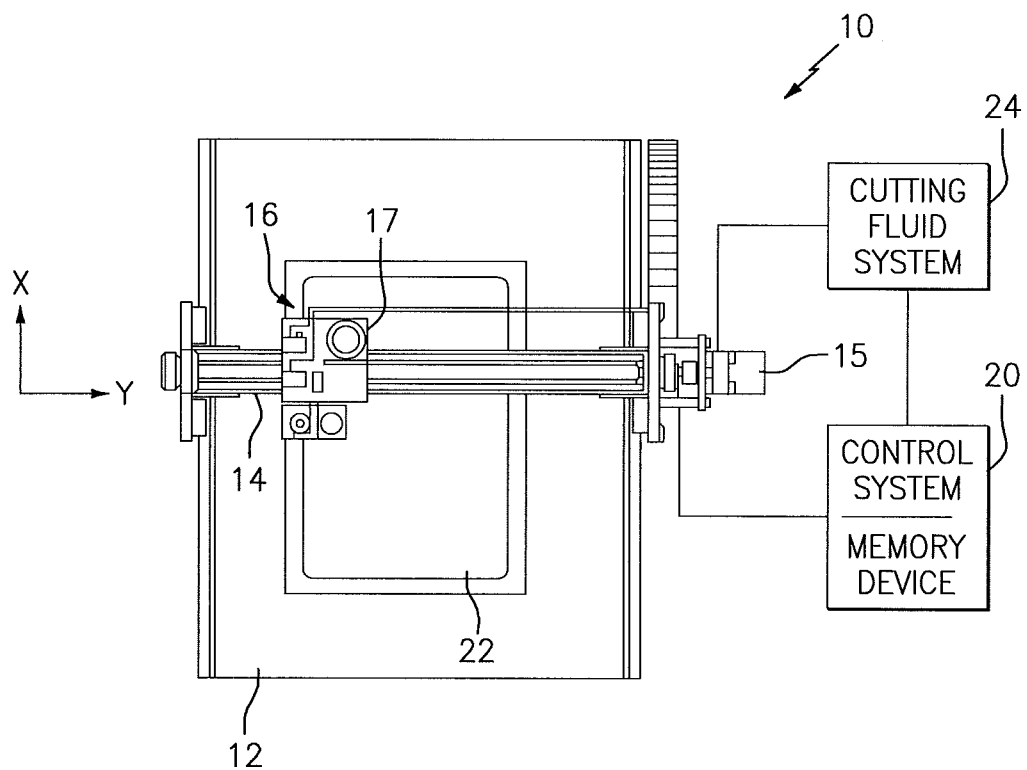
FIG. 1 is a diagrammatic planar view of an exemplary automated glass scoring device.
Figure 2:
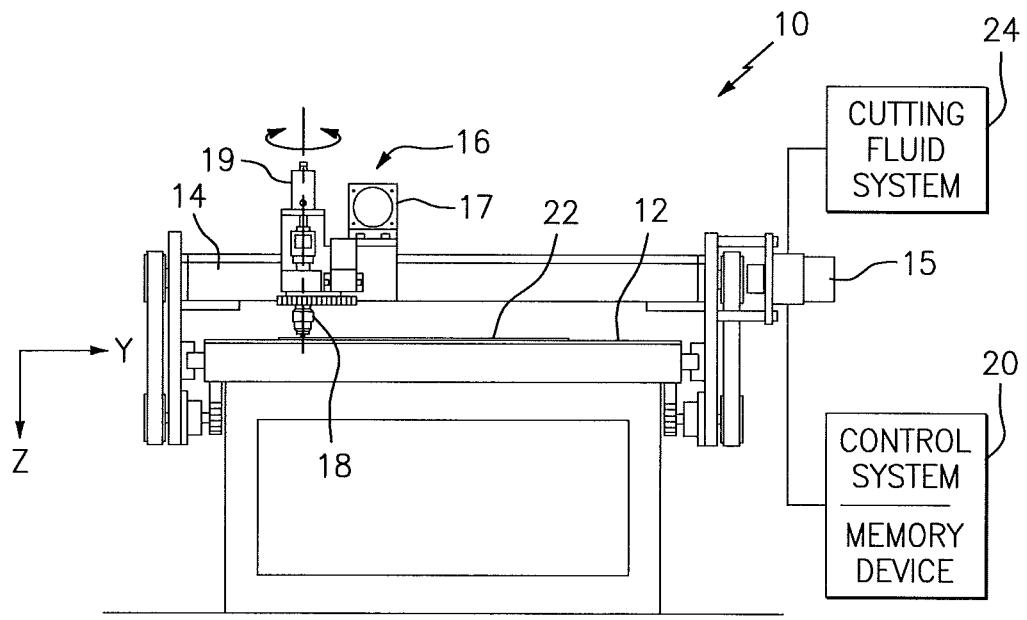
FIG. 2 is a diagrammatic side view of the exemplary automated glass scoring device shown in FIG. 1.

An example of an automated glass scoring device 10 is shown in FIGS. 1 and 2. The glass scoring device 10 includes a table 12, a bridge 14, a carriage 16, and a cutter head 18. The bridge 14 includes a bridge drive mechanism 15 that enables movement of the bridge 14 in a first direction (e.g., X-axis movement) relative to the table 12. The carriage 16 includes a carriage drive mechanism 17 that enables movement of the carriage 16 along the bridge 14 in a second direction (e.g., Y-axis movement) relative to the table 12.

The carriage 16 further includes a head drive mechanism 19 that enables movement of the cutter head 18 in a third direction (e.g., Z-axis movement) toward and away from the table 12. The aforesaid drive mechanisms 15, 17, 19 may be mechanically oriented (e.g., a mechanical linear actuator), or pneumatically oriented (e.g., a pneumatic linear actuator), or hydraulically oriented (e.g., a hydraulic linear actuator), or electrically oriented (e.g., electric linear drive motors), including combinations thereof. The above described automated glass scoring device 10 is provided here as an example of such a device, and the present disclosure is not limited thereto.

The automated glass scoring device 10 may include a control system 20 having a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on executable operational instructions that are stored in a memory device. When the processor implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The operational instructions permit the control system 20 to control movement of one or more of the bridge 14, the carriage 16, and the cutter head 18 relative to the table 12, and therefore relative to a work piece 22 mounted on the table 12. The control system may include an input device that allows a user to input information into the control system; e.g., relating to the desired scoring of the work piece 22.

The automated glass scoring device 10 further includes a cutting fluid system 24 that is configured to provide a cutting fluid to a pillar post portion of the cutter head 18; e.g., including a cutting fluid reservoir and a pump. The control system 20 may be in communication with the cutting fluid system to permit the control system 20 to operationally control aspects of the cutting fluid system (e.g., on/off, fluid flow rates, etc.). In such cases, instructions stored within the control system 20 may permit control of the cutting fluid system. The present disclosure is not limited to an automated cutting fluid system, and can be used with cutting fluid systems that are partially automated, or systems that are manually operated. Cutting fluids useful in the process of scoring glass (e.g., kerosene) are known to the public.

The cutter head 18 (mounted with the carriage 16) is configured to mount a pillar post 26. Examples of a pillar post 26 according to the present disclosure can be seen in FIGS. 3 and 5-8. The pillar post 26 includes a shaft portion 28. The shaft portion 28 is configured to be received within a mating chuck of the cutter head 18. The mating relationship between the shaft portion 28 and the chuck may allow rotatable movement between the pillar post 26 and the cutter head 18; e.g., allowing the pillar post 26 to rotate relative to the cutter head 18. The present disclosure is not limited to any particular pillar post shaft/chuck configuration.

The pillar post 26 includes a cutting fluid inlet port 30, at least one internal passage, a fluid exit port 32, a fluid flow metering element 34, and may include a cutter wheel 36. The cutter wheel 36 is rotatably mounted relative to the pillar post 26. The at least one internal passage provides a path for the passage of fluid from the inlet port 30 to the fluid exit port 32. The fluid exit port 32 is positioned so that fluid exiting the fluid exit port 32 will either be in direct contact with the cutter wheel 36, or will be disposed in close proximity to the cutter wheel 36. At least a portion of the fluid flow metering element 34 is disposed within the internal passage.

Figure 4:
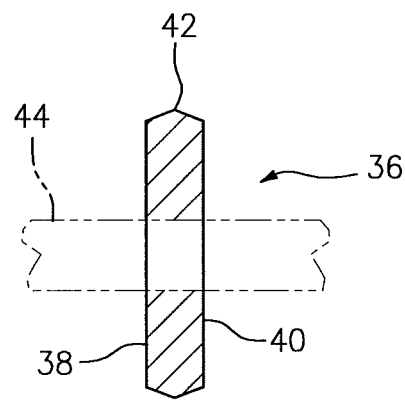
FIG. 4 is a sectional view of a cutter wheel embodiment that may be used with the present pillar post.
Figures 5, 5A:
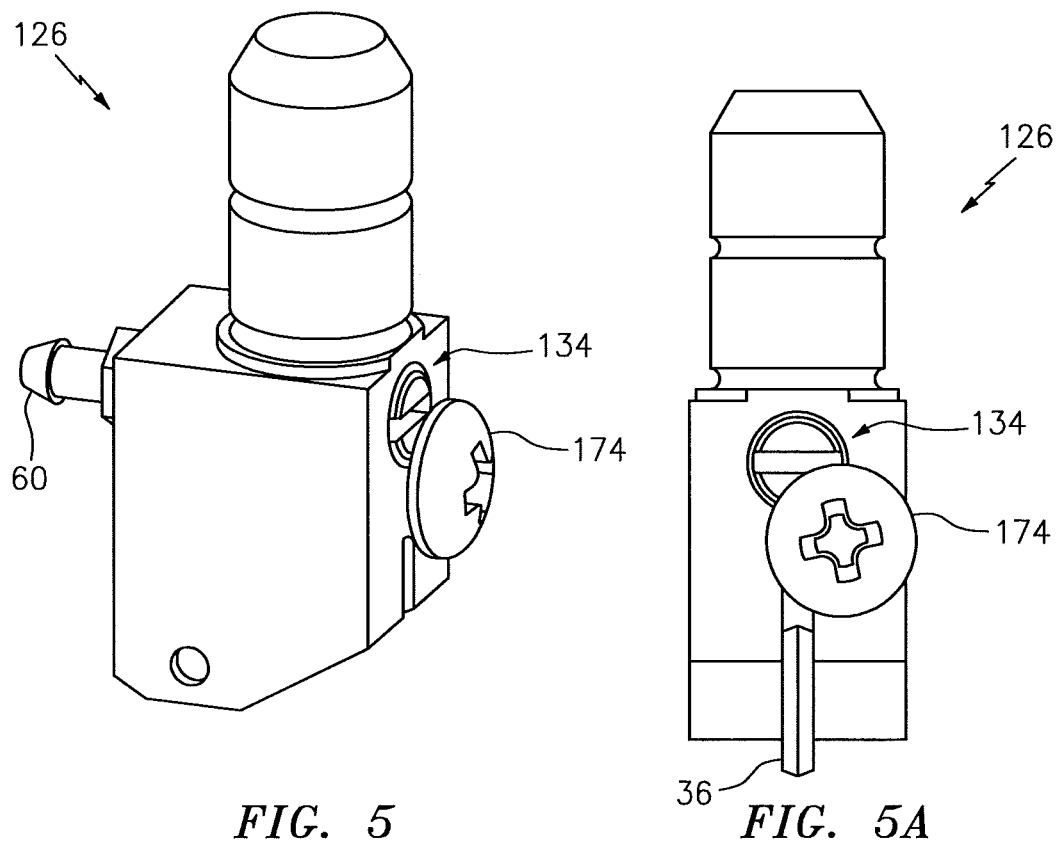
FIG. 5 is a perspective view of a pillar post embodiment according to the present disclosure.
FIG. 5A is a rear view of the pillar post embodiment shown in FIG. 5.

A variety of cutter wheels 36 may be used, and the present disclosure is not limited to any particular type of cutter wheel 36. For example as shown in FIG. 4, a cutter wheel 36 may have a cylindrical shape with a width disposed between a first lateral surface 38 and a second lateral surface 40. The outer radial circumferential region between the lateral surfaces has a sharpened "V" configuration, forming a circumferential edge 42. The cutter wheel 36 may include an axle that permits rotatable movement of the cutter wheel 36 relative to the pillar post 26, or alternatively, the cutter wheel 36 may be rotatably mounted on an axle 44 independent of the cutter wheel 36. The axle in either embodiment is mounted relative to the pillar post 26.

Figure 3:
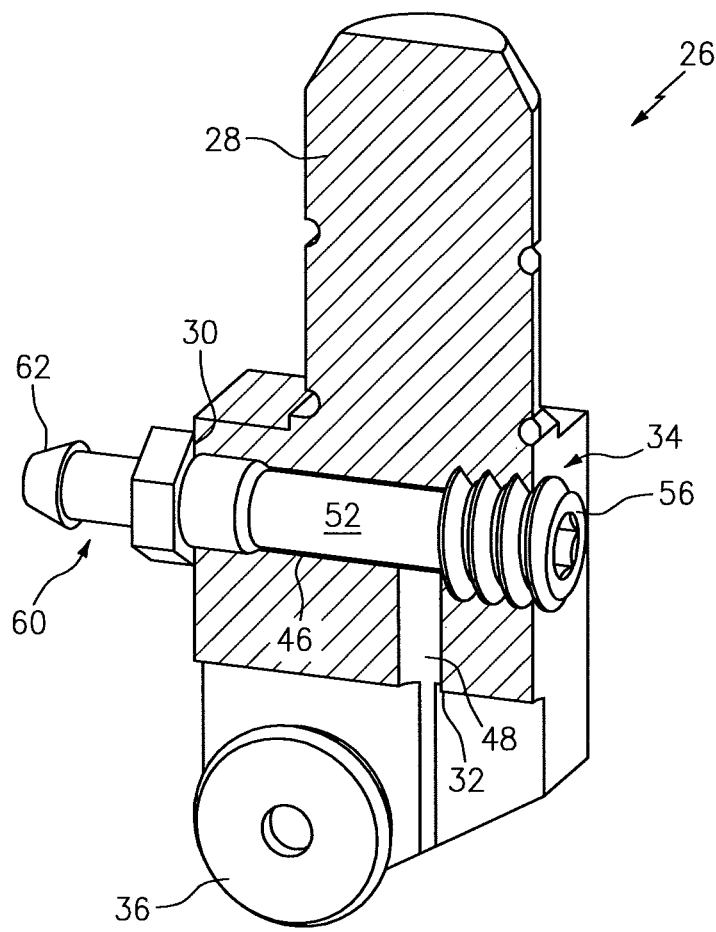
FIG. 3 is a perspective sectional view of a pillar post embodiment according to the present disclosure.
Figure 3A:
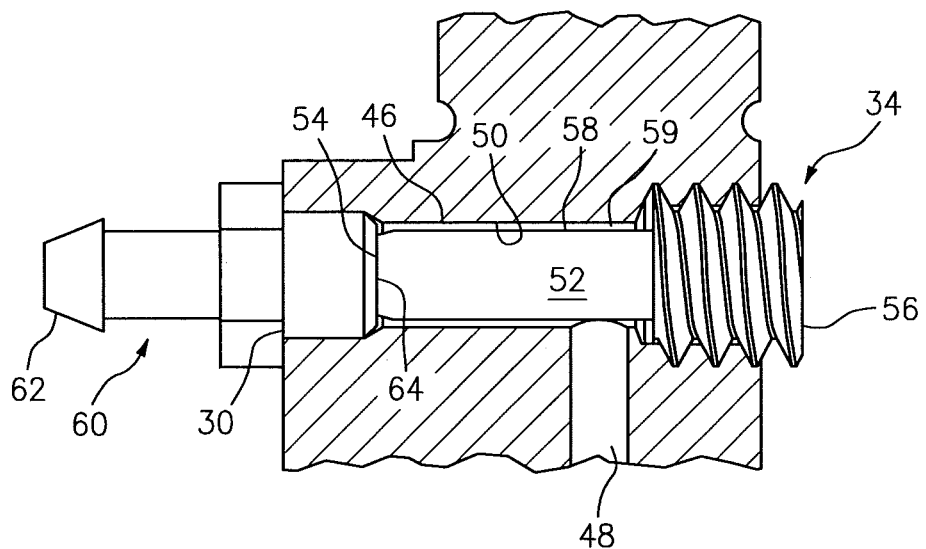
FIG. 3A is an enlarged partial view of FIG. 3.

In the embodiment shown in FIGS. 3 and 3A, the pillar post 26 includes a first internal passage 46 and a second internal passage 48. The first internal passage 46 extends from the fluid inlet port 30, and at least a portion of the first internal passage 46 has an inner diameter surface 50. The second internal passage 48 extends between the first internal passage 46 and the fluid exit port 32. Collectively, the first internal passage 46 and the second internal passage 48 provide a fluid path between the fluid inlet port 30 and the fluid exit port 32. The flow metering element 34 includes an axial body 52 extending between a distal end 54 and a head 56. The axial body 52 of the flow metering element 34 is configured to be received within the first internal passage 46 of the pillar post 26, and has a surface 58 disposed at an outer diameter that is less than the diameter of the inner diameter surface 50 of the first internal passage 46. Hence, there is an annular void 59 disposed between the inner diameter of the first internal passage 46 and the outer diameter of the axial body 52 through which fluid may pass. The head 56 of the flow metering element 34 is threaded for attachment to the pillar post 26. The present disclosure is not limited to this embodiment, however. A tubing nipple 60 is attached to the pillar post 26 at the fluid inlet port 30 and extends a distance into the first internal passage 46. The tubing nipple 60 has a tubing end 62 and a distal end 64. In the embodiment shown in FIG. 3 the distal end 64 of the tubing nipple 60 and the distal end 54 of the flow metering element 34 have mating geometries (e.g., male and female). Moving the flow metering element 34 relative to the pillar post 26 and the tubing nipple 60 will vary the space between the distal ends 54, 64 of the nipple 60 and the flow metering element 34, thereby permitting the user to selectively alter the geometry of the flow passage there between and consequently the fluid flow parameters there between as well. The position of the flow metering element 34 relative to the tubing nipple 60 can be accomplished by screwing the flow metering element 34 into or out of the pillar post 26. The movement and positioning of the flow metering element 34 relative to the tubing nipple 60 can be accomplished by means other than screwing the flow metering element 34 into or out of the pillar post 26, and the present disclosure is not therefore limited to this example. In addition, the flow metering element 34 may be selectively positioned within the first internal passage 46 by means other than the axial positioning shown in FIGS. 3 and 3A; e.g., a flow metering element 34 may be positioned perpendicular to the first internal passage 46 and moved into the first internal passage 46 in a perpendicular manner.

Figure 6:
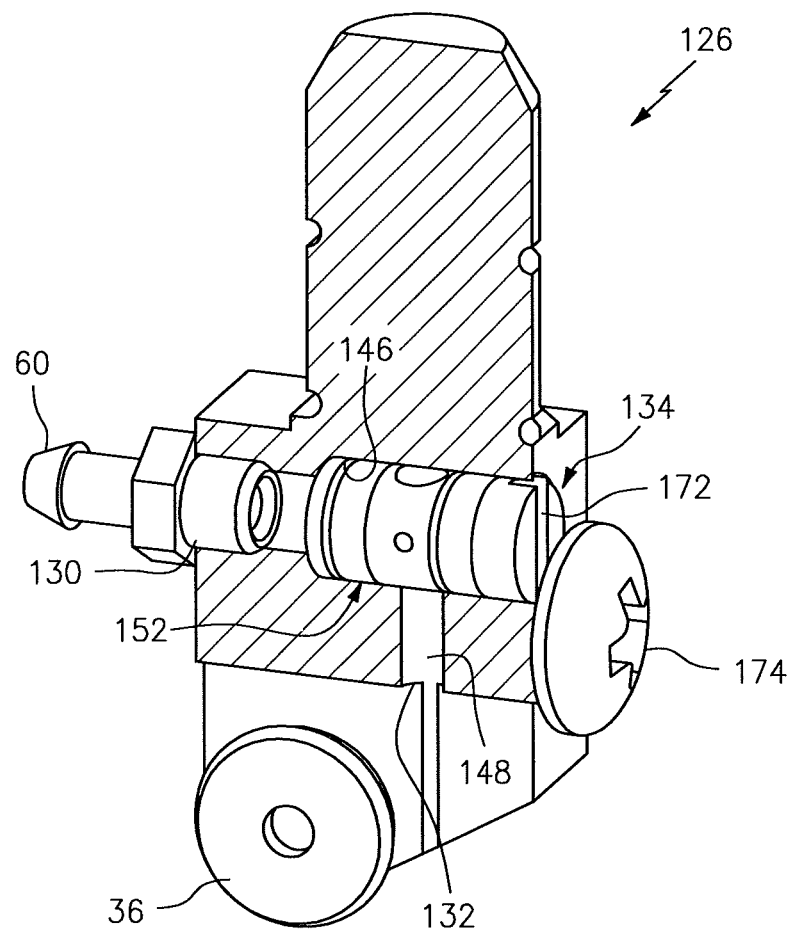
FIG. 6 is a diagrammatic sectional side view of a pillar post embodiment according to the present disclosure.
Figure 6A:
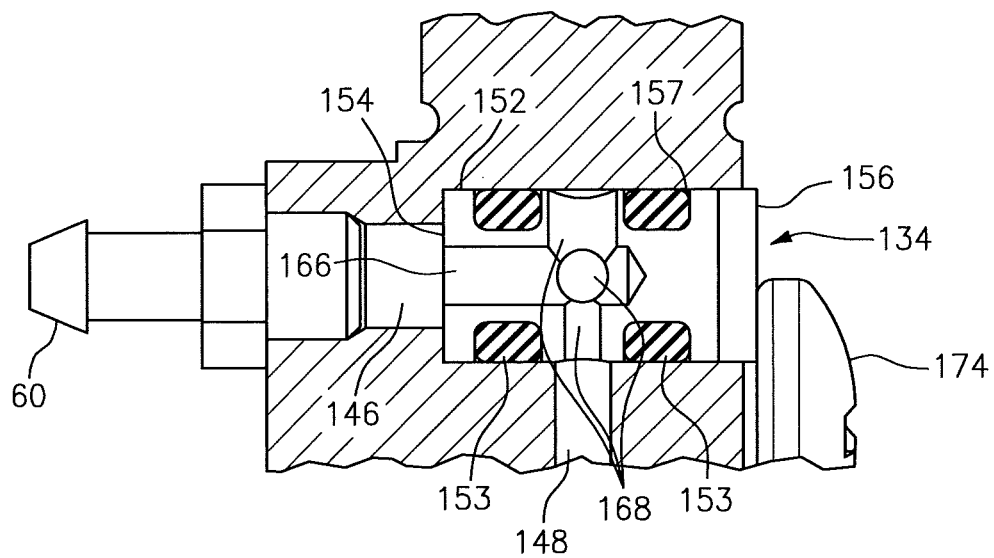
FIG. 6A is an enlarged sectional view of the pillar post embodiment shown in FIG. 6.
Figure 7:
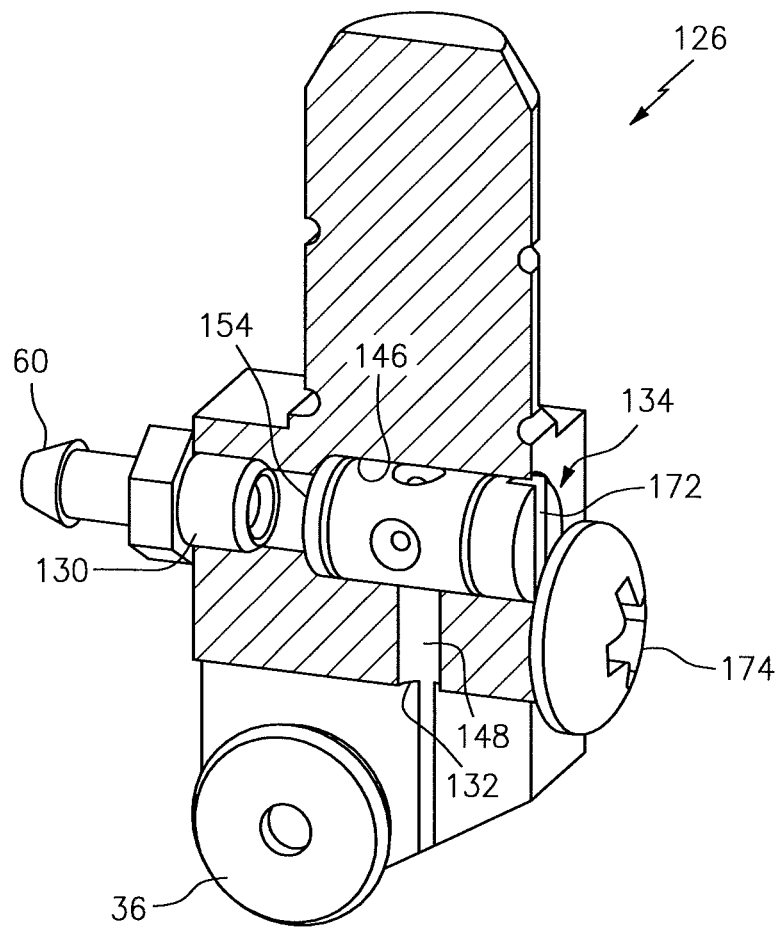
FIG. 7 is a diagrammatic sectional side view of a pillar post embodiment according to the present disclosure.
Figure 7A:
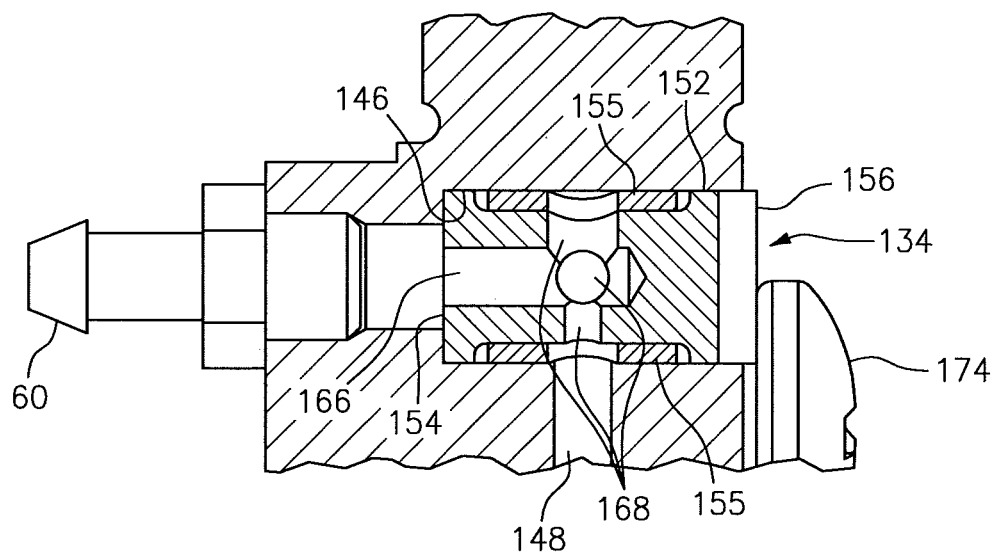
FIG. 7A is an enlarged sectional view of the pillar post embodiment shown in FIG. 7.

In the embodiment shown in FIGS. 5-9, the pillar post 126 also includes a first internal passage 146 and a second internal passage 148 as described above. In this embodiment, the flow metering element 134 includes an axial body 152 extending between a distal end 154 and a head 156. The axial body 152 further includes a central passage 166 and one or more lateral ports 168 extending between the central passage 166 and the outer diameter surface of the axial body 152 (e.g., see also FIG. 9). The central passage 166 extends from the distal end 154 a distance sufficient to intersect the lateral ports 168, but does not extend entirely through the flow metering element 134. Hence, the central passage 166 and any one of the lateral ports 168 provide a fluid passage through the flow metering element 134. The flow metering device 134 may also include one or more seals configured to create a fluid seal between the outer diameter surface of the axial body 152 and the inner diameter surface of the first internal passage 146. For example, the embodiment shown in FIGS. 6 and 6A shows a pair of O-rings 153 extending around the circumference of the axial body 152; e.g., each O-ring 153 is partially disposed within a circumferentially extending groove 157. The embodiment shown in FIGS. 7 and 7A, shows an alternative embodiment wherein an O-ring 155 is disposed around each lateral port 168; e.g., each O-ring 155 is partially disposed within a cavity disposed around the respective lateral port 168. The present disclosure is not limited to either of these sealing embodiments. The flow metering element 134 is disposed in the first internal passage 146 so that one of the lateral ports 168 may be aligned with the second internal passage 148. When one of the lateral ports 168 is aligned with second internal passage 148, a fluid flow path is established from the inlet port 130 of the pillar post 126, through the first internal passage 146, through the flow metering element 134 (i.e., through the central passage 166 and the aligned lateral port 168 of the flow metering element 134), and through the second internal passage 148; i.e., a fluid path through the pillar post 126 via the fluid inlet port 130 and the fluid exit port 132.

Figure 8:
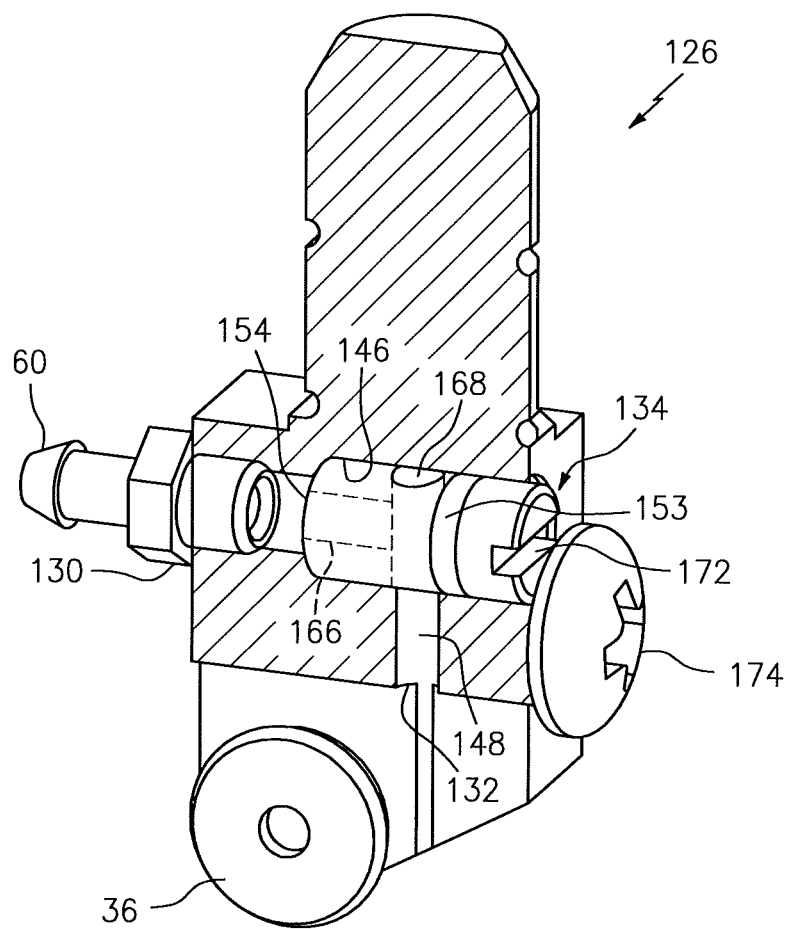
FIG. 8 is a diagrammatic perspective view of a pillar post embodiment according to the present disclosure.
Figure 9:
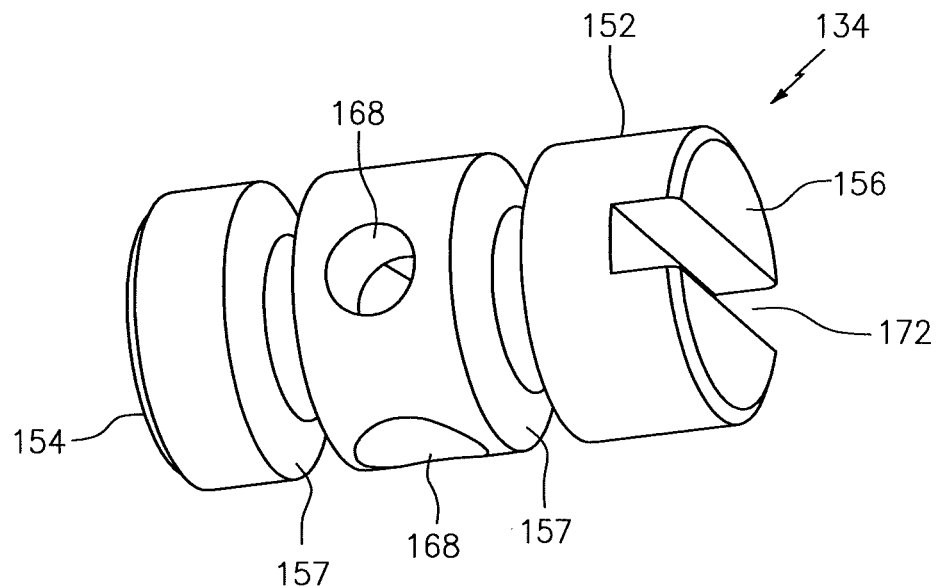
FIG. 9 is a diagrammatic perspective view of a flow metering element embodiment.
Figure 9A:
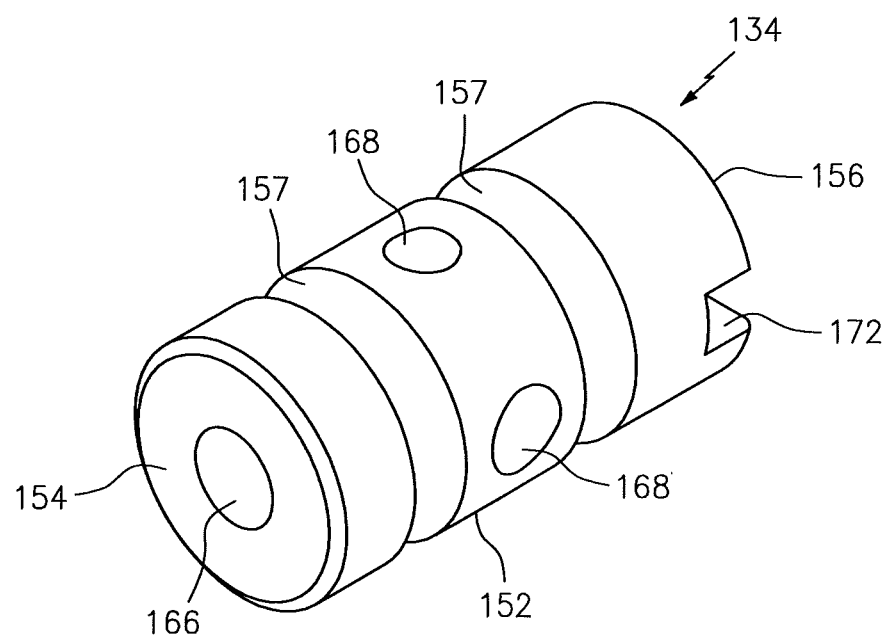
FIG. 9A is a diagrammatic perspective view of the flow metering element embodiment shown in FIG. 9.
Figure 9B:
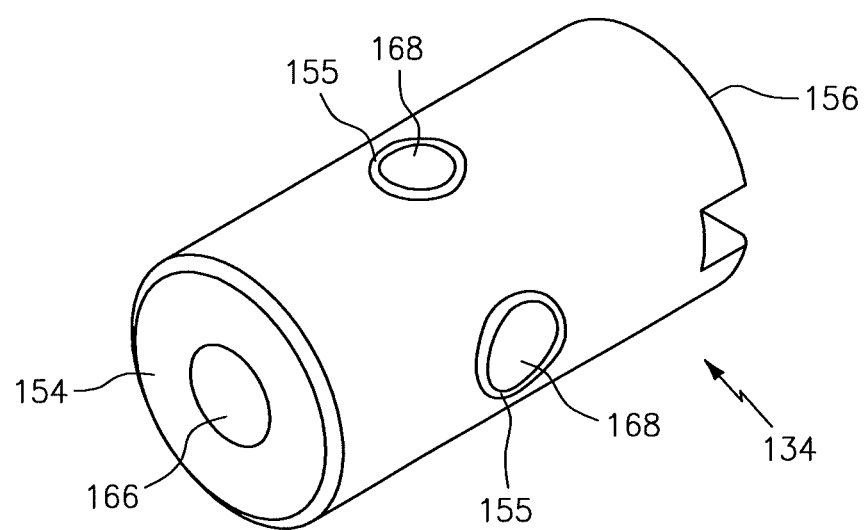
FIG. 9B is a diagrammatic perspective view of a flow metering element embodiment.

In the embodiment shown in FIG. 8, the flow metering element 134 includes a central passage 166 (shown in phantom lines) and one or more lateral ports 168 extending between the central passage 166 and the outer diameter surface of the axial body 152 (e.g., see also FIG. 9). The central passage 166 extends from the distal end 154 a distance sufficient to intersect the lateral ports 168, but does not extend entirely through the flow metering element 134. Hence, the central passage 166 and any one of the lateral ports 168 provide a fluid passage through the flow metering element 134. The flow metering device 134 may also include one or more seals (e.g., O-ring 153) configured to create a fluid seal between the outer diameter surface of the axial body 152 and the inner diameter surface of the first internal passage 146. In this embodiment, the flow metering device 134 may be oriented to minimize fluid flow through the pillar post 126, or to prevent fluid flow through the pillar post (i.e., the flow metering device can be rotated to a position where the lateral port is only slightly aligned with the second internal passage 148, or not aligned with the second internal passage 148).

As indicated above, the flow metering element 134 has one or more lateral ports 168. Each of the plurality of lateral ports 168 may have a different geometric configuration; i.e., a different diameter. In the embodiments, shown in FIGS. 6, 6A, 7, and 7A, the flow metering element 134 has four (4) lateral ports 168, each with a different diameter. The flow metering element 134 may be rotated within the first internal passage 146 to allow any one of the different lateral ports 168 to be aligned with the second internal passage 148. To facilitate rotation of the flow metering element 134, the flow metering element 134 embodiment shown in FIGS. 5-9 includes a channel 172 disposed in the head 156 of the element 134 that can be accessed by a tool (e.g., a screw driver) to rotate the flow metering element 134. The channel 172 may also be used to indicate lateral port 168 positions (e.g., the position of the channel 172 alone), or may be used in combination with markings on the pillar post 126. The present disclosure is not limited to these embodiments, however, and alternative structure for rotating the flow metering element 134 may be used, and/or alternative structure for indicating lateral port 168 position. Hence, by rotating the flow metering element 134 so that different lateral ports 168 are aligned with the second internal passage 148, the characteristics of the fluid flow through pillar post 126 may be changed; e.g., to allow a greater amount of fluid flow, or a lesser amount of fluid flow, to change the velocity of the fluid flow there through, etc. The lateral ports 168 shown in FIGS. 6-9 are shown as cylindrically shaped passages. The present disclosure is not limited thereto and the geometry of the lateral ports 168 may be altered to change the fluid flow characteristics there through. The term "diameter" as used herein includes "hydraulic diameter" for non-circular ports.

The embodiments shown in FIGS. 5-8 includes a fastener 174 (e.g., a screw) threadably engaged with the pillar post 126 adjacent the flow metering element 134 to hold the flow metering element 134 within the first internal passage 146. The present disclosure is not limited to this embodiment for holding the flow metering element 134.

Cutting fluids facilitate the glass scoring process, but different job parameters (e.g., the type of glass, the cutting wheel 36 being used, the traverse rate of the cutting wheel 36, the type of cutting fluid being used, etc.) benefit from different cutting fluid flow rates. The present disclosure allows the user to selectively adjust the characteristics of the flow of a cutting fluid through the pillar post 126. As a result, the user can adjust the flow of cutting fluid to a flow that is advantageous for a particular glass scoring job.

The present pillar posts 26 described above may be used with a variety of different types of automated glass scoring devices 10, and are not therefore limited to use with any particular type of automated glass scoring device 10.

What is claimed is:

1. A pillar post for mounting a cutter wheel, comprising:
 a body having a fluid inlet port, at least one internal passage, a fluid exit port, and wherein the body is configured for mounting a cutter wheel for rotation about a rotational axis;
 a cylindrically shaped fluid flow metering element having an outer diameter surface, the fluid flow metering element extending axially between a distal end and a head, the fluid flow metering element having a central passage extending axially from the distal end, and at least one lateral port extending radially between the central passage and the outer diameter surface, wherein the fluid flow metering element is rotatably disposed within the internal passage and the head of the fluid flow metering element is exposed at an exterior surface of the body; and
 a fastener threadably engaged with the body adjacent the head of the fluid flow metering element, the fastener configured to hold the axial body within the internal passage by engaging the head of the fluid flow metering element;
 wherein the fluid flow metering element is rotatable between at least one closed position and at least one open position, and in the open position the lateral port is aligned with the fluid exit port, thereby placing the fluid inlet port in fluid communication with the fluid exit port via a fluid path that includes the central passage and the lateral port of the fluid flow metering element.

2. The pillar post of claim 1, wherein the at least one internal passage includes a first internal passage and a second internal passage;
wherein the first internal passage extends from the fluid inlet port and intersects with the second internal passage, and the second internal passage extends from the fluid exit port; and
wherein the fluid flow metering element is disposed within the first internal passage.

3. The pillar post of claim 1, wherein the at least one lateral port includes a first lateral port and a second lateral port.

4. The pillar post of claim 3, wherein the first lateral port has a first cross-sectional area and the second lateral port has a second cross-sectional area, and the first cross-sectional area is different from the second cross-sectional area.

5. The pillar post of claim 1, wherein the fluid flow metering element includes at least one seal element engaged with the outer diameter surface of the fluid flow metering element, the at least one seal element extending around a circumference of the fluid flow metering element.

6. An automated glass scoring device, comprising:
a cutting fluid system;
a table;
a bridge mounted for translation along the table;
a carriage mounted for translation along the bridge; and
a cutter head mounted with the carriage, which cutter head includes a pillar post for mounting a cutter wheel, wherein the pillar post includes:
  a body having a fluid inlet port, at least one internal passage, a fluid exit port, and wherein the body is configured for mounting a cutter wheel for rotation about a rotational axis;
  a cylindrically shaped fluid flow metering element having an outer diameter surface, the fluid flow metering element extending axially between a distal end and a head, the fluid flow metering element having a central passage extending axially from the distal end, and at least one lateral port extending radially between the central passage and the outer diameter surface, wherein the fluid flow metering element is rotatably disposed within the internal passage and the head of the fluid flow metering element is exposed at an exterior surface of the body; and
  a fastener threadably engaged with the body adjacent the head of the fluid flow metering element, the fastener configured to hold the axial body within the internal passage by engaging the head of the fluid flow metering element;
wherein the fluid flow metering element is rotatable between at least one closed position and at least one open position, and in the open position the lateral port is aligned with the fluid exit port, thereby placing the fluid inlet port in fluid communication with the fluid exit port via a fluid path that includes the central passage and the lateral port of the fluid flow metering element;
wherein the cutting fluid system is in fluid communication with the fluid inlet port of the pillar post and is configured to selectively provide a flow of cutting fluid to the fluid inlet port.

7. A cutter wheel pillar post, comprising:
a body having a fluid inlet port, a first internal passage, a fluid exit port, and a second internal passage, the first internal passage is in fluid communication with the fluid inlet port and the second internal passage is in fluid communication with the fluid exit port, and wherein the body is configured for mounting a cutter wheel for rotation about a rotational axis;
a fluid flow metering element comprising a body having an outer diameter surface, the body extending axially between a distal end and a head, the body comprising a central passage extending axially from the distal end and at least one lateral port extending radially between the central passage and the outer diameter surface of the axial body;
at least one seal element configured to provide a fluid seal between the outer diameter surface of the axial body and an inner diameter surface of the first internal passage; and
a fastener engaged with the body adjacent the exposed head of the fluid flow metering element and is configured for selective engagement with head of the fluid flow metering element;
wherein the body of the fluid flow metering element is disposed within the internal passage of the body, and the fluid flow metering element is selectively rotatable within the internal passage of the body between at least one closed position wherein the at least one lateral port is not aligned with the second internal passage, and at least one open position wherein the at least one lateral port is aligned with the second internal passage; and
wherein in the closed position the fluid inlet port is not in fluid communication with the fluid exit port, and in the open position the fluid inlet port is in fluid communication with the fluid exit port; and
wherein the first internal passage extends to an exterior surface of the body, and the head of the fluid flow metering element is exposed at the exterior surface of the body.

8. The pillar post of claim 7, wherein the fluid exit port is spaced apart from the rotational axis of the cutter wheel.

9. The pillar post of claim 8, wherein the fluid exit port is disposed forward of the rotational axis of the cutter wheel.

10. The pillar post of claim 7, wherein the at least one lateral port extending radially between the central passage and the outer diameter surface of the axial body includes a first lateral port and a second lateral port, wherein the first lateral port has a first diameter and the second lateral port has a second diameter, and the second diameter is greater than the first diameter;
wherein the at least one open position includes a first open position and a second open position; and
wherein in the first open position, the first lateral port is aligned with the second internal passage, and in the second open position, the second lateral port is aligned with the second internal passage.

* * * * *